(12) United States Patent
Yu et al.

(10) Patent No.: US 10,126,802 B1
(45) Date of Patent: Nov. 13, 2018

(54) METHOD AND DEVICE FOR DETERMINING STATIC EQUIVALENCES OF DISTRIBUTION NETWORKS

(71) Applicant: Chongqing University, Chongqing (CN)

(72) Inventors: Juan Yu, Chongqing (CN); Bo Hu, Chongqing (CN); Wei Dai, Chongqing (CN); Linwei Li, Chongqing (CN); Wei Yan, Chongqing (CN); Xia Zhao, Chongqing (CN)

( * ) Notice: Subject to any disclaimer, the term of this patent is extended or adjusted under 35 U.S.C. 154(b) by 0 days.

(21) Appl. No.: 15/729,461

(22) Filed: Oct. 10, 2017

(30) Foreign Application Priority Data

Jun. 6, 2017 (CN) .......................... 2017 1 0418918

(51) Int. Cl.
| | |
|---|---|
| *G06G 7/48* | (2006.01) |
| *G06F 1/28* | (2006.01) |
| *G06F 11/30* | (2006.01) |
| *G06F 17/16* | (2006.01) |
| *G06F 17/11* | (2006.01) |

(52) U.S. Cl.
CPC ............ *G06F 1/28* (2013.01); *G06F 11/3058* (2013.01); *G06F 17/11* (2013.01); *G06F 17/16* (2013.01)

(58) Field of Classification Search
CPC .......................................................... G06F 1/28
USPC ............................................................ 703/6
See application file for complete search history.

(56) References Cited

PUBLICATIONS

Milanovic: Validation of Equivalent Dynamic Model of Active Distribution Network Cell; IEEE Transactions on Power Systems, vol. 28, No. 3, Aug. 2013; pp. 2101-2110.*

* cited by examiner

*Primary Examiner* — Hugh Jones
(74) *Attorney, Agent, or Firm* — Dragon Sun Law Firm, P.C.; Jinggao Li, Esq.

(57) ABSTRACT

The present disclosure discloses a method and device for determining static equivalences of distribution networks, relating to the technical field of static equivalences of power systems. The method comprises: acquiring node admittance matrices related to a border node and a distribution network, power loss and a voltage value and a current value of the border node; constructing static equivalence determination conditions for determining static equivalences of the distribution network, comprising a consistency of sensitivity equation, a consistency of power loss equation, an equivalent network power balance equation and a Kirchhoff's current equation; and calculating static equivalent parameters according to the static equivalence determination conditions. The inventive method and device are simple and effective, the consistency of sensitivity and power loss before and after equivalence are considered comprehensively, and the distributed generators' voltage and power support characteristics in an active distribution network are reserved.

6 Claims, 5 Drawing Sheets

METHOD AND DEVICE FOR DETERMINING STATIC EQUIVALENCES OF DISTRIBUTION NETWORKS

CROSS-REFERENCE TO RELATED APPLICATION(S)

This application claims priority under 35 U.S.C. § 119(a)-(d) to Chinese Patent Application Serial No. 201710418918.1, titled "A Method and Device for Determining Static Equivalences of Distribution Networks," filed Jun. 6, 2017, the disclosure of which is hereby incorporated by reference herein in its entirety.

TECHNICAL FIELD

The present disclosure relates to the technical field of static equivalences of power systems, and in particular to a method and device for determining static equivalences of distribution networks.

BACKGROUND

A distribution network refers to a network for distributing electric power in power systems. With a great number of distributed generators and diverse loads and the introduction of novel AC/DC hybrid distribution network frames, in a distribution network, there are both generators and loads, rather than only loads. To be an active distribution network in which the power flows can be two directions, higher requirements are proposed on the coordination control level and service quality of distribution networks. A transmission network is connected with multiple distribution networks. Since there are a large number of elements such as loads, branches, distribution generators and sections in the distribution networks and the transmission network itself is large in size, it is difficult to intensively and collectively analyze the transmission network and the distribution networks. Therefore, it is necessary to perform equivalence on the distribution networks. In the equivalent method of the distribution networks, the influences of the complex distribution networks on the transmission network are retained in a simple equivalent network, so that important characteristics of the influences of the distribution networks on the transmission network are reserved while decreasing the calculation complexity. Accordingly, the accuracy of steady-state analysis of power systems is improved.

Existing static equivalent methods for an active distribution network mainly include a PQ equivalent method, and an equivalent method of constant impedance, current and load (ZIP equivalent method). In the PQ equivalent method, distribution networks are replaced with their equivalent power injections/extractions. The ZIP equivalent method further considers the nonlinear characteristics of loads with respect to voltage changes. However, the existing methods mainly have the following disadvantages: 1) voltage and power support characteristics of distributed generators are ignored, and the power injection direction from a transmission network to a distribution network cannot be changed, so that a large error is brought to the steady-state analysis of power systems; and 2) only the consistency of power flow states before and after equivalence is taken into consideration, but the consistency of sensitivity and power loss before and after equivalence are ignored, so the accuracy of equivalence of the active distribution networks is low.

SUMMARY

In view of this, a technical problem to be solved by the present disclosure is to provide a method and device for determining static equivalences of distribution networks.

According to one aspect of the present disclosure, a method for determining static equivalences of distribution networks is provided, including the steps of: acquiring node admittance matrices related to a border node and a distribution network, power loss of the distribution network, and a voltage value and a current value of the border node; constructing static equivalence determination conditions for determining static equivalences of the distribution network, wherein the static equivalence determination conditions include a consistency of sensitivity equation, a consistency of power loss equation, an equivalent network power balance equation and a Kirchhoff's current equation; and calculating, based on the node admittance matrices, the power loss, and the voltage value and the current value and according to the static equivalence determination conditions, static equivalent parameters of the equivalent distribution network.

Optionally, the step of acquiring node admittance matrices related to a border node and a distribution network, power loss of the distribution network, and a voltage value and a current value of the border node includes: acquiring node admittance matrices and $Y_{BI}$, where the $Y_{LL(L\hat{B})(L\hat{B})}$ is a node admittance matrix at a border non-generator node B, the $Y_{LL(L\hat{E})(L\hat{E})}$ is a node admittance matrix between non-generator nodes at external nodes of the distribution network, the $Y_{LL(L\hat{E})(L\hat{B})}$ is a node admittance matrix between non-generator nodes at external nodes of the distribution network and a non-generator node at the border node B, and the $Y_{BI}$ is a matrix of the sum of admittances between the border node B and internal nodes of the transmission network; and, acquiring power loss $S_{loss}$ of the distribution network, and a current value $I_B$ and a voltage value $V_B$ at the border node B.

Optionally, the step of constructing static equivalence determination conditions for determining static equivalences of the distribution network includes: constructing the consistency of sensitivity equation:

$$\frac{1}{Z_{eq1}} - \frac{Z_{eq2}}{Z_{eq1}^2 + Z_{eq1}Z_{eq2}} = Y_{LL(L\hat{B})(L\hat{B})} - Y_{LL(L\hat{B})(L\hat{E})} Y_{LL(L\hat{E})(L\hat{E})}^{-1} Y_{LL(L\hat{E})(L\hat{B})} - Y_{BI},$$

where $Z_{eq1}$ is the impedance between the border node B and an equivalent load node $L_{eq}$, and $Z_{eq2}$ is the impedance between the $L_{eq}$ and an equivalent generator node $G_{eq}$; constructing the consistency of power loss equation:

$$|I_B|^2 Z_{eq1} + |I_{Geq}|^2 Z_{eq2} = S_{loss},$$

where $|I_B|$ denotes the magnitude of the current value $I_B$, $|I_{Geq}|$ denotes the magnitude of the equivalent generator current at the $G_{eq}$, $Z_{eq1}$ is the impedance between the border node B and the $L_{eq}$, and $Z_{eq2}$ is the impedance between the $L_{eq}$ and the $G_{eq}$; constructing the equivalent network power balance equation:

$$I^*_B V_B - I^*_{Leq} V_B + I^*_{Leq} I_B Z_{eq1} + I^*_{Geq}(V_B - I_B Z_{eq1} + I_{Geq} Z_{eq2}) = S_{loss},$$

where $V_B$ is the voltage at the border node B, $I_{Leq}$ is the current at the $L_{eq}$, $I_{Geq}$ is the current at the $G_{eq}$, $V_{Leq}$ is the voltage at the $L_{eq}$, and $V_{Geq}$ is the voltage at the $G_{eq}$; and constructing the Kirchhoff's current equation:

$$-I_{Leq}+I_{Geq}+I_B=0.$$

Optionally, the step of calculating, based on the node admittance matrices, the power loss, and the voltage value and the current value and according to the static equivalence determination conditions, static equivalent parameters of the equivalent distribution network includes: solving the consistency of sensitivity equation, the consistency of power loss equation, the equivalent network power balance equation and the Kirchhoff's current equation to obtain $Z_{eq1}$, $Z_{eq2}$, $I_{Leq}$ and $I_{Geq}$, where $I_{Leq}$ is the current at the $L_{eq}$, $I_{Geq}$ is the current at the $G_{eq}$, $Z_{eq1}$ is the impedance between the border node B and the $L_{eq}$, and $Z_{eq2}$ is the impedance between the $L_{eq}$ and the $G_{eq}$.

Optionally, the step of constructing the equivalent network power balance equation further includes: constructing a first formula: $S_B=I^*_B V_B$; constructing a second formula: $V_{Leq}=V_B-I_B Z_{eq1}$; constructing a third formula: $S_{Leq}=I^*_{Leq}V_{Leq}$; constructing a fourth formula: $V_{Geq}=V_{Leq}+I_{Geq}Z_{eq2}$; and, constructing a fifth formula: $S_{Geq}=I^*_{Geq}V_{Geq}$; and the step of calculating, based on the node admittance matrices, the power loss, and the voltage value and the current value and according to the static equivalence determination conditions, static equivalent parameters of the equivalent distribution network further includes: solving the second formula, the third formula, the fourth formula and the fifth formula to obtain $V_{Leq}$, $S_{Leq}$, $V_{Geq}$, and, where $S_B$ is the power at the border node B, $S_{Leq}$ is the power at the $L_{eq}$, and $S_{Geq}$ is the power at the $G_{eq}$.

According to another aspect of the present disclosure, a device for determining static equivalences of distribution networks is provided, including: an acquisition module configured to acquire node admittance matrices related to a border node and a distribution network, power loss of the distribution network and a voltage value and a current value of the border node; a construction module configured to construct static equivalence determination conditions for determining static equivalences of the distribution network, wherein the static equivalence determination conditions includes: a consistency of sensitivity equation, a consistency of power loss equation, an equivalent network power balance equation and a Kirchhoff's current equation; and, a calculation module configured to calculate, based on the node admittance matrices, the power loss, and the voltage value and the current value and according to the static equivalence determination conditions, static equivalent parameters of the equivalent distribution network.

Optionally, the acquisition module is specifically configured to acquire node admittance matrices $Y_{LL(L\bar{B})(L\bar{B})}$, $Y_{LL(L\bar{E})(L\bar{E})}$, $Y_{LL(L\bar{E})(L\bar{B})}$ and $Y_{BI}$, and acquire power loss $S_{loss}$ of the distribution network, and a current value $I_B$ and a voltage value $V_B$ of the border node B, where the $Y_{LL(L\bar{B})(L\bar{B})}$ is a node admittance matrix at a border non-generator node B, the $Y_{LL(L\bar{E})(L\bar{E})}$ is a node admittance matrix between non-generator nodes at external nodes of the distribution network, the $Y_{LL(L\bar{E})(L\bar{B})}$ is a node admittance matrix between non-generator nodes at external nodes of the distribution network and a non-generator node at the border node B, and the $Y_{BI}$ is a matrix of the sum of admittances between the border node B and internal nodes of the transmission network.

Optionally, the construction module is further configured to construct the consistency of sensitivity equation:

$$\frac{1}{Z_{eq1}} - \frac{Z_{eq2}}{Z_{eq1}^2 + Z_{eq1}Z_{eq2}} = Y_{LL(L\bar{B})(L\bar{B})} - Y_{LL(L\bar{B})(L\bar{E})}Y_{LL(L\bar{E})(L\bar{E})}^{-1}Y_{LL(L\bar{E})(L\bar{B})} - Y_{BI},$$

where $Z_{eq1}$ is the impedance between the border node B and an equivalent load node $L_{eq}$, and $Z_{eq2}$ is the impedance between the $L_{eq}$ and an equivalent generator node $G_{eq}$; the construction module is further configured to construct the consistency of power loss equation:

$$|I_B|^2 Z_{eq1}+|I_{Geq}|^2 Z_{eq2}=S_{loss},$$

where $|I_B|$ denotes the magnitude of the current value $I_B$, $|I_{Geq}|$ denotes the magnitude of the equivalent generator current at the $G_{eq}$, $Z_{eq1}$ is the impedance between the border node B and the $L_{eq}$, and $Z_{eq2}$ is the impedance between the $L_{eq}$ and the $G_{eq}$. The construction module is further configured to construct the equivalent network power balance equation:

$$I^*_B V_B-I^*_{Leq}V_B+I^*_{Leq}I_B Z_{eq1}+I^*_{Geq}(V_B-I_B Z_{eq1}+I_{Geq}Z_{eq2})=S_{loss},$$

where $V_B$ is the voltage at the border node B, $I_{Leq}$ is the current at the $L_{eq}$, $I_{Leq}$ is the current at the $G_{eq}$, $V_{Leq}$ is the voltage at the $L_{eq}$, and $V_{Geq}$ is the voltage at the $G_{eq}$. Moreover, the construction module is further configured to construct the Kirchhoff's current equation:

$$-I_{Leq}+I_{Geq}+I_B=0.$$

Optionally, the calculation module is further configured to, based on the node admittance matrices, the power loss, and the voltage value and the current value, solve the consistency of sensitivity equation, the consistency of power loss equation, the equivalent network power balance equation and the Kirchhoff's current equation to obtain $Z_{eq1}$, $Z_{eq2}$, $I_{Leq}$ and $I_{Geq}$.

Optionally, the construction module is further configured to construct a first formula: $S_B=I^*_B V_B$; construct a second formula: $V_{Leq}=V_B-I_B Z_{eq1}$; construct a third formula: $S_{Leq}=I^*_{Leq}V_{Leq}$; construct a fourth formula: $V_{Geq}=V_{Leq}+I_{Geq}Z_{eq2}$; and, construct a fifth formula: $S_{Geq}=I^*_{Geq}V_{Geq}$; and the calculation module is further configured, based on the node admittance matrices, the power loss, and the voltage value and the current value, to solve the second formula, the third formula, the fourth formula and the fifth formula to obtain $V_{Leq}$, $S_{Leq}$, $V_{Leq}$; and $S_{Geq}$, where $S_B$ is the power at the border node B, $S_{Leq}$ is the power at the $L_{eq}$, and $S_{Geq}$ is the power at the $G_{eq}$.

In the method and device for determining static equivalences of distribution networks, by acquiring node admittance matrices, power loss, and voltage and current of a border node before equivalence, constructing a consistency of sensitivity equation, a consistency of power loss equation, an equivalent network power balance equation and a Kirchhoff's current equation, and solving the equations to obtain equivalent parameters. The invented method and device are simple and effective, the consistency of sensitivity and the consistency of power loss before and after equivalence are considered comprehensively, and the distributed generators' voltage and power support characteristics in an active distribution network are reserved. Accordingly, the change in power injection direction from a transmission network to the active distribution network can be reflected, and the accuracy of steady-state analysis of power systems is improved.

BRIEF DESCRIPTION OF DRAWINGS

To describe the technical solutions in the embodiments of the present disclosure more clearly, the accompanying drawings to be used in the descriptions of the embodiments will be briefly described below. Apparently, the accompanying drawings described hereinafter are some of embodiments of the present disclosure, and a person of ordinary skill in the art can obtain other accompanying drawings according to these drawings without any creative effort.

DETAILED DESCRIPTION

The present disclosure will be described below more completely with reference to the accompanying drawings, and exemplary embodiments of the present disclosure will also be described. The technical solutions in the embodiments of the present disclosure will be clearly and completely described below with reference to the accompanying drawings in the embodiments of the present disclosure. Apparently, the embodiments described herein are merely a part but not all of the embodiments of the present disclosure. All other embodiments obtained by a person of ordinary skill in the art without any creative effort on the basis of the embodiments in the present disclosure shall fall into the protection scope of the present disclosure. The technical solutions of the present disclosure will be described below in various aspects with reference to the accompanying drawings and embodiments.

The terms such as "first" or "second" used hereinafter are merely for distinguishing in description, and have no other special meanings.

Figure 1:
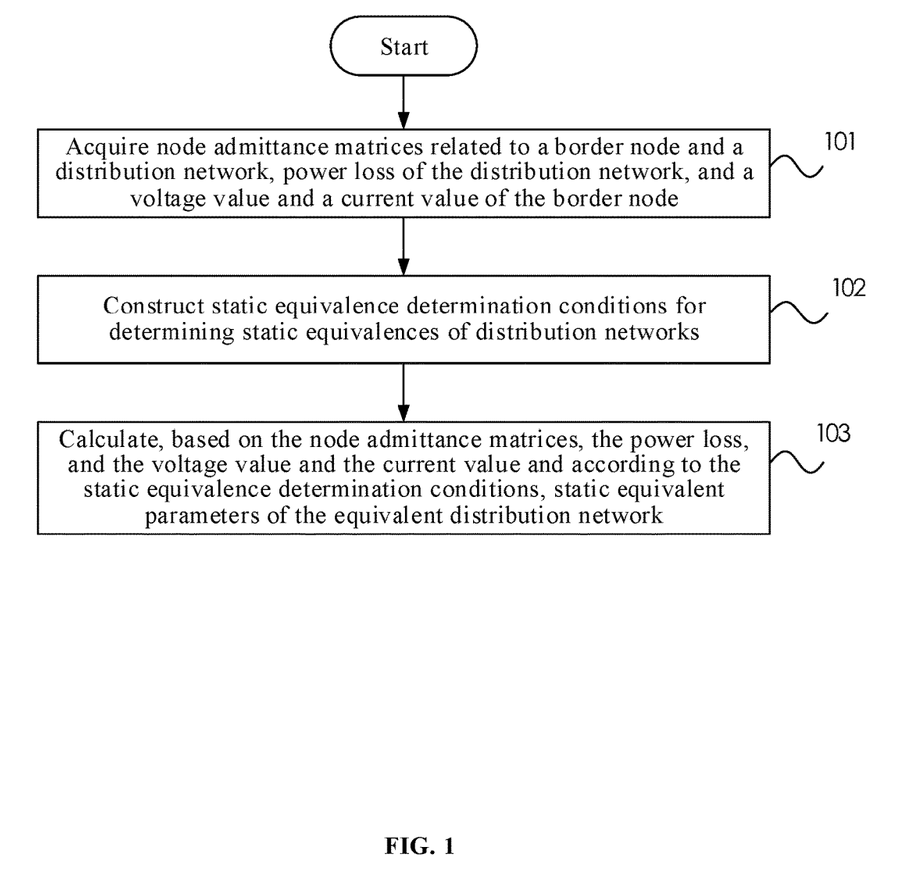
FIG. 1 is a schematic flowchart of an embodiment of a method for determining static equivalences of distribution networks according to the present disclosure.

FIG. 1 is a schematic flowchart of an embodiment of a method for determining static equivalences of distribution networks according to the present disclosure. As shown in FIG. 1, the method includes the following steps:

Step 101: Node admittance matrices related to a border node and a distribution network are acquired, and power loss of the distribution network and a voltage value and a current value of the border node are acquired.

Figure 2:
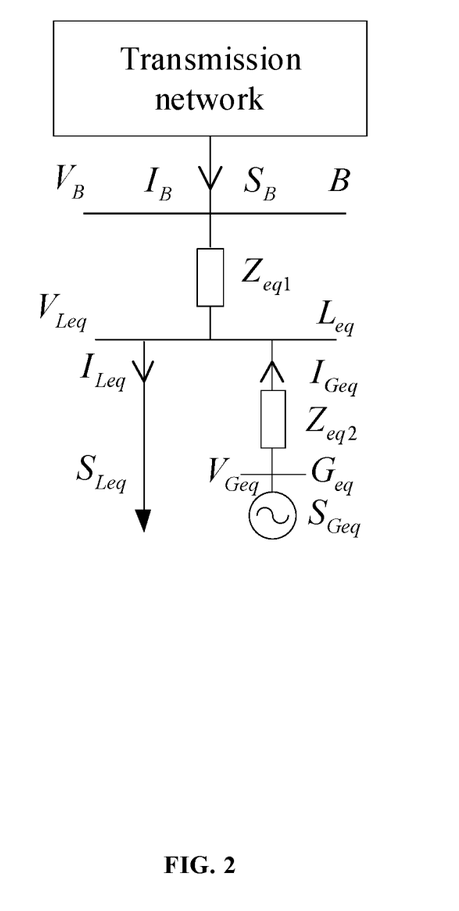
FIG. 2 is a schematic diagram of an equivalent network of an active distribution network having or supporting distributed generators.

As shown in FIG. 2, a border node B in an active distribution network is determined, and node matrices $Y_{LL(L\hat{B})(L\hat{B})}$, $Y_{LL(L\hat{E})(L\hat{E})}$, $Y_{LL(L\hat{E})(L\hat{B})}$ and $Y_{BI}$ the distribution network before equivalence, power loss $S_{loss}$ of the distribution network before equivalence, and the current $I_B$ and voltage $V_B$ of the border node are acquired, where $Y_{LL(L\hat{B})(L\hat{B})}$ is a node admittance matrix at a border non-generator node, $Y_{LL(L\hat{E})(L\hat{E})}$ is a node admittance matrix between non-generator nodes at external nodes of the distribution network, $Y_{LL(L\hat{E})(L\hat{B})}$ is a node admittance matrix between non-generator nodes at external nodes of the distribution network and a non-generator node at the border node, and $Y_{BI}$ is the sum of admittances between the border node and internal transmission network nodes.

Step 102: Static equivalence determination conditions for determining static equivalences of distribution networks are constructed, wherein the static equivalence determination conditions include a consistency of sensitivity equation, a consistency of power loss equation, an equivalent network power balance equation, a Kirchhoff's current equation and the like.

The equation of the consistency of sensitivity before and after equivalence is constructed as follows:

$$\frac{1}{Z_{eq1}} - \frac{Z_{eq2}}{Z_{eq1}^2 + Z_{eq1}Z_{eq2}} = \\ Y_{LL(L\hat{B})(L\hat{B})} - Y_{LL(L\hat{B})(L\hat{E})}Y_{LL(L\hat{E})(L\hat{E})}^{-1}Y_{LL(L\hat{E})(L\hat{B})} - Y_{BI}, \quad (1)$$

where $Y_{LL(L\hat{B})(L\hat{B})}$ is a node admittance matrix at a border non-generator node, $Y_{LL(L\hat{E})(L\hat{E})}$ is a node admittance matrix between non-generator nodes at external nodes of the distribution network, $Y_{LL(L\hat{E})(L\hat{B})}$ is a node admittance matrix between non-generator nodes at external nodes of the distribution network and a non-generator node at the border node, and $Y_{BI}$ is the sum of admittances between the border node and internal transmission network nodes. The $Z_{eq2}$ is the impedance between the border node B and an equivalent load node $L_{eq}$, and $Z_{eq2}$ is the impedance between the $L_{eq}$ and an equivalent generator node $G_{eq}$.

The equation of the consistency of power loss before and after equivalence is constructed as follows:

$$|I_B|^2 Z_{eq1} + |I_{Geq}|^2 Z_{eq2} = S_{loss} \quad (2),$$

where $|I_B|$ denotes the magnitude of the current $I_B$ at the border node, $|I_{Geq}|$ denotes the magnitude of the equivalent generator current at the node $G_{eq}$, $Z_{eq1}$ is the impedance between the node B and the node $L_{eq}$, $Z_{eq2}$ is the impedance between the node $L_{eq}$ and the node $G_{eq}$, and $S_{loss}$ is the power loss of the distribution network before equivalence.

The equivalent network power balance equation is constructed as follows:

$$S_B - S_{Leq} + S_{Geq} - S_{loss} = 0 \quad (3);$$

$$S_B = I^*_B V_B \quad (4);$$

$$V_{Leq} = V_B - I_B Z_{eq1} \quad (5);$$

$$S_{Leq} = I^*_{Leq} V_{Leq} \quad (6);$$

$$V_{Geq} = V_{Leq} + I_{Geq} Z_{eq2} \quad (7);$$

$$S_{Geq} = I^*_{Geq} V_{Geq} \quad (8);$$

$$I^*_B V_B - I^*_{Leq} V_B + I^*_{Leq} I_B Z_{eq1} + I^*_{Geq}(V_B - I_B Z_{eq1} + I_{Geq} Z_{eq2}) = S_{loss} \quad (9).$$

The equations (4) to (8) are substituted into (3) to construct the equivalent network power balance equation (9), wherein, $S_B$, $I_B$ and $V_B$ are the power, current and voltage at the border node B, $S_{Leq}$ is the power at an equivalent load node $L_{eq}$, $S_{Geq}$ is the power at an equivalent generator node $G_{eq}$, $I_{Leq}$ is the current at the equivalent load node $L_{eq}$, $I_{Geq}$ is the current at the equivalent generator node $G_{eq}$, $V_{Leq}$ is the voltage at the equivalent load node $L_{eq}$, $V_{Geq}$ is the voltage at the equivalent generator node $G_{eq}$, $Z_{eq1}$ is the impedance between the node B and the node $L_{eq}$, and $Z_{eq2}$ is the impedance between the node $L_{eq}$ and the node $G_{eq}$. $S_{loss}$ is the power loss of the distribution network before equivalence. Wherein, $(*)^*$ denotes the conjugate operation of $(*)$.

The Kirchhoff's current equation is constructed as follows:

$$-I_{Leq} + I_{Geq} + I_B = 0 \quad (10).$$

The formula (10) is the Kirchhoff's current equation at the equivalent load node, where $I_B$ is the current at the border node B, $I_{Leq}$ is the current at the equivalent load node $L_{eq}$, and $I_{Geq}$ is the current at the equivalent generator node $G_{eq}$.

Step 103: Based on the node admittance matrices, the power loss, and the voltage value and the current value and according to the static equivalence determination conditions, static equivalent parameters of the equivalent distribution network are calculated.

By using the input data acquired in the step 101, four non-linear equations are constructed according to the formulae (1), (2), (9) and (10); and, by using a method for solving the non-linear equations, four unknown quantities $Z_{eq1}$, $Z_{eq2}$, $I_{Leq}$ and $I_{Geq}$ can be solved, where $I_{Leq}$ is the current at the equivalent load node $L_{eq}$, $I_{Geq}$ is the current at the equivalent generator node $G_{eq}$, $Z_{eq1}$ is the impedance between the node B and the node $L_{eq}$, and $Z_{eq2}$ is the impedance between the node $L_{eq}$ and the node $G_{eq}$. Other equivalent parameters $S_{Leq}$, $S_{Geq}$, $V_{Leq}$ and $V_{Geq}$ are solved by the formulae (4) to (8).

In the method for determining static equivalences of distribution networks in this embodiment, a method for determining static equivalences of distribution networks by comprehensively considering the consistency of sensitivity and the consistency of power loss is provided. By inputting, by using a computer and a program, node admittance matrices, network power loss of the distribution network and the voltage and current of a border node, then constructing a consistency of sensitivity equation before and after equivalence, a consistency of power loss equation, an equivalent network power balance equation and a Kirchhoff's current equation, and solving the equations to obtain equivalent parameters, the inventive method and device are simple and effective, the consistency of sensitivity and the consistency of power loss before and after equivalence are considered comprehensively, and the distributed generators' voltage and power support characteristics in an active distribution network are reserved. Accordingly, the change in power injection direction from a transmission network to the active distribution network can be reflected, and the accuracy of steady-state analysis of power systems is improved.

Figure 3A:
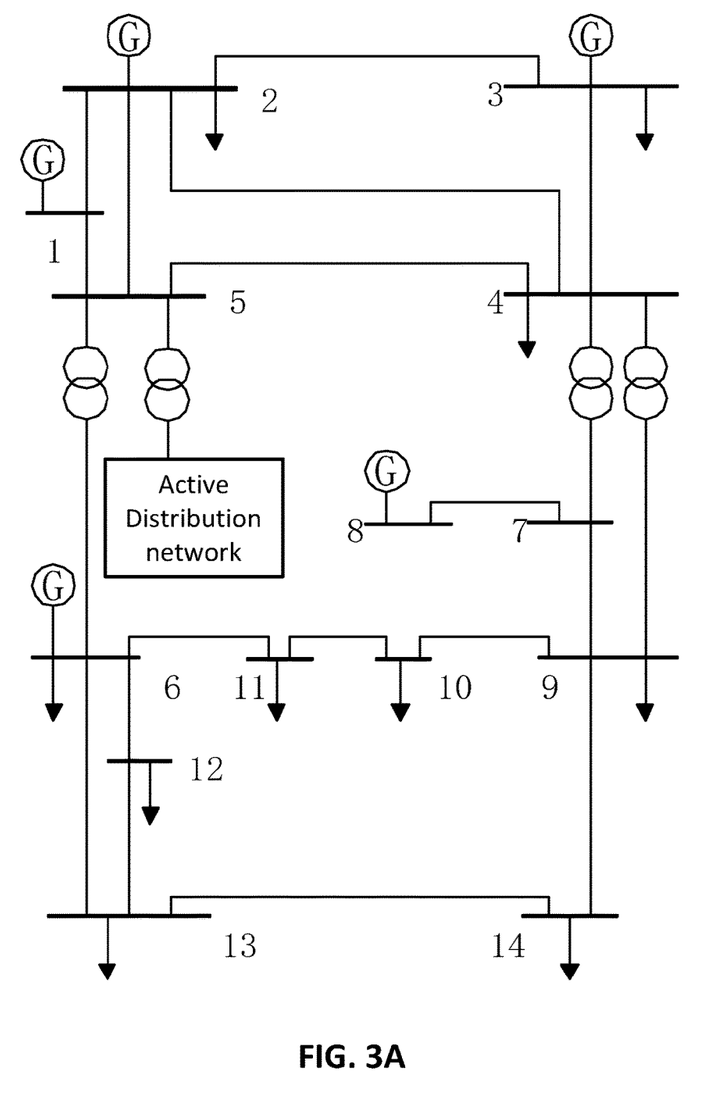
FIGS. 3A and 3B are schematic diagrams of nodes of a transmission network and an active distribution network.
Figure 3B:
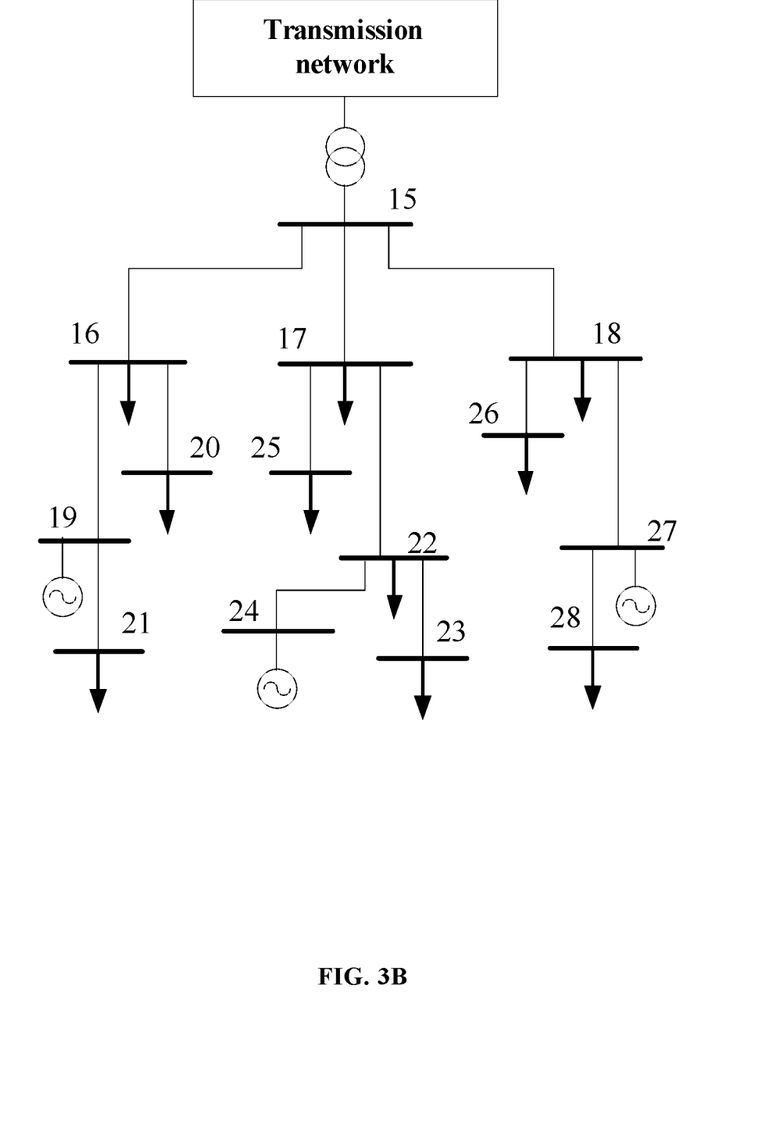

In an embodiment, the description is given by taking a system consisting of an IEEE transmission system with 14 nodes and an active distribution system with 14 nodes shown in FIGS. 3A and 3B as example. The detailed data of the active distribution system with 14 nodes is shown in the following Table 1.

TABLE 1

Detailed data of the active distribution system with 14 nodes

| Generator node | P(MW) | V(p.u.) |
|---|---|---|
| 19 | 4 | 1 |
| 24 | 4 | 1 |
| 27 | 4 | 1 |

| Line | R(p.u.) | X(p.u.) |
|---|---|---|
| 5-15 | 0 | 0.556 |
| 15-16 | 0.075 | 0.1 |
| 16-19 | 0.09 | 0.18 |
| 18-26 | 0.09 | 0.12 |
| 19-21, 27-28 | 0.04 | 0.04 |
| 16-20, 17-22, 22-23, 18-27 | 0.08 | 0.11 |
| 15-17, 15-18, 22-24, 15-25 | 0.11 | 0.11 |

| Load node | P (MW) | Q (MVar) |
|---|---|---|
| 16 | 2.8 | 1.6 |
| 17 | 5.6 | 2.7 |
| 18 | 1.4 | 0.9 |
| 20 | 4.2 | 1.5 |
| 21 | 2.1 | 1.2 |
| 22 | 7 | 3 |
| 23 | 6.3 | 2 |
| 25 | 1.4 | 0.9 |
| 26 | 1.4 | 0.7 |
| 28 | 2.94 | 1 |

The specific steps of determining static equivalences of distribution networks are as follows.

Step 201: Data is input. Node matrices $Y_{LL(L\bar{B})(L\bar{B})}$, $Y_{LL(L\hat{E})(L\hat{E})}$, $Y_{LL(L\hat{E})(L\bar{B})}$ and $Y_{BI}$ of the distribution network before equivalence, power loss $S_{loss}=0.0063+j0.0070$ of the distribution network before equivalence, and the current $I_B=0.2194-j0.0748$ and voltage $V_B=0.9583-j0.2895$ of a border node are acquired, where $Y_{LL(L\bar{B})(L\bar{B})}$ is a node admittance matrix at a border non-generator node, $Y_{LL(L\hat{E})(L\hat{E})}$ is a node admittance matrix between non-generator nodes at external nodes of the distribution network, $Y_{LL(L\hat{E})(L\bar{B})}$ is a node admittance matrix between non-generator nodes at external nodes of the distribution network and a non-generator node at the border node, and $Y_{BI}$ is the sum of admittances between the border node and internal transmission network nodes. Various specific matrices are as follows:

$Y_{LL(L\bar{B})(L\hat{E})}=[13.8909-j17.2889]$;

$$Y_{LL(L\hat{E})(L\bar{B})} = \begin{bmatrix} -4.7999 + j6.4000 \\ -4.5455 + j4.5455 \\ -4.5455 + j4.5455 \\ 0 \\ 0 \\ 0 \\ 0 \\ 0 \\ 0 \end{bmatrix};$$

$Y_{LL(L\bar{B})(L\hat{E})} = [\,-4.7999 + j6.4000 \quad -4.5455 + j4.5455 \quad -4.5455 + j4.5455 \quad 0 \quad 0 \quad 0 \quad 0 \quad 0 \quad 0\,]$;

$$Y_{LL(L\hat{E})(L\hat{E})}^{-1} = \begin{bmatrix} 11.3465 - j16.7903 & 0 & \cdots & 0 \\ 0 & 13.4152 - j15.0369 & \cdots & 0 \\ \cdots & \cdots & \cdots & \cdots \\ 0 & 0 & \cdots & 12.5000 - j12.5000 \end{bmatrix};$$

$Y_{BI}=[0-j1.7979]$.

Step 202: An equation of the consistency of sensitivity before and after equivalence is constructed as follows:

$$\frac{1}{Z_{eq1} + Z_{eq2}} = Y_{LL(L\hat{B})(L\hat{B})} - Y_{BI} - Y_{LL(L\hat{B})(L\hat{E})} Y_{LL(L\hat{E})(L\hat{E})}^{-1} Y_{LL(L\hat{E})(L\hat{B})}. \quad (1)$$

In the formula (1), there are unknown quantities on the left, where $Z_{eq1}$ is the impedance between the node B and a node $L_{eq}$, and $Z_{eq2}$ is the impedance between the node $L_{eq}$ and a node $G_{eq}$.

Step 203: An equation of the consistency of power loss before and after equivalence is constructed as follows:

$$|I_B|^2 Z_{eq1} + |I_{Geq}|^2 Z_{eq2} = S_{loss}. \quad (2)$$

In the formula (2), $|I_B|=0.2318$ is the amplitude of the current at the border node $I_B=0.2194-j0.0748$, $Z_{eq1}$ is the impedance between the node B and the node $L_{eq}$, and $Z_{eq2}$ is the impedance between the node $L_{eq}$ and the node $G_{eq}$. $S_{loss}=0.0063+j0.0070$ denotes the power loss of the distribution network before equivalence.

Step 204: The equivalent network power balance equation is constructed as follows:

$$S_B - S_{Leq} + S_{Geq} - S_{loss} = 0 \quad (3);$$

$$S_B = I^*_B V_B \quad (4);$$

$$V_{Leq} = V_B - I_B Z_{eq1} \quad (3);$$

$$S_{Leq} = I^*_{Leq} V_{Leq} \quad (4);$$

$$V_{Geq} = V_{Leq} + I_{Geq} Z_{eq2} \quad (5);$$

$$S_{Geq} = I^*_{Geq} V_{Geq} \quad (6);$$

$$I^*_B V_B - I^*_{Leq} V_B + I^*_{Leq} I_B Z_{eq1} + I^*_{Geq}(V_B - I_B Z_{eq1} + I_{Geq} Z_{eq2}) = S_{loss} \quad (9).$$

The equations (4) to (8) are substituted into equation (3) to construct the equivalent network power balance equation (9), where $S_B=0.2319+j0.0082$, $I_B=0.2194-j0.0748$ and $V_B=0.9583-j0.2895$ are the power, current and voltage at the border node B, $S_{Leq}$ is the power at an equivalent load node $L_{eq}$, $S_{Geq}$ is the power at an equivalent generator node $G_{eq}$, $I_{Leq}$ is the current at the equivalent load node $L_{eq}$, $I_{Geq}$ is the current at the equivalent generator node $G_{eq}$, $V_{Leq}$ is the voltage at the equivalent load node $L_{eq}$, $V_{Geq}$ is the voltage at the equivalent generator node $G_{eq}$, $Z_{eq1}$ is the impedance between the node B and the node $L_{eq}$, and $Z_{eq2}$ is the impedance between the node $L_{eq}$ and the node $G_{eq}$. $S_{loss}$ is the power loss of the distribution network before equivalence. Wherein, (*)* denotes the conjugate operation of (*).

$I^*_B=0.2194+j0.0748$.

Step 205: The Kirchhoff's current equation is constructed as follows:

$$-I_{Leq} + I_{Geq} I_B = 0 \quad (10).$$

The formula (10) is the Kirchhoff's current equation at the equivalent load node, where $I_B=0.2194-j0.0748$ is the current at the border node B, $I_{Leq}$ is the current at the equivalent load node $L_{eq}$, and $I_{Geq}$ is the current at the equivalent generator node $G_{eq}$.

Step 206: The equivalent parameter equations are solved: by using the input data acquired in the step 1), four non-linear equations are constructed according to the formulae (1), (2), (9) and (10); and, by using a method for solving the non-linear equations, four unknown quantities $Z_{eq1}$, $Z_{eq2}$, $I_{Leq}$ and $I_{Geq}$ can be solved, where $I_{Leq}$ is the current at the equivalent load node $L_{eq}$, $I_{Geq}$ is the current at the equivalent generator node $G_{eq}$, $Z_{eq1}$ is the impedance between the node B and the node $L_{eq}$, and $Z_{eq2}$ is the impedance between the node $L_{eq}$ and the node $G_{eq}$. Other equivalent parameters $S_{Leq}$, $S_{Geq}$, $V_{Leq}$ and $V_{Geq}$ are solved by the formulae (4) to (8).

The results of calculation are as follows:

$Z_{eq1}=0.0343-j0.0611$;

$Z_{eq2}=0.0356+j0.0297$;

$I_{Leq}=-0.5174+j0.2660$;

$I_{Geq}=0.2980-j0.1912$.

By solving equations (4) to (8), other equivalent parameters are solved:

$S_{Leq}=56.9477+j9.6270$;

$S_{Geq}=34.3864+j9.5121$;

$V_{Leq}=0.9462-j0.3004$;

$V_{Geq}=0.9625-j0.2983$.

The method for determining static equivalences of distribution networks in this embodiment is applied to a distribution network for experiments. The solved results are compared with the main existing methods, and a relative error and an absolute error of each method in changing operation parameters of the transmission network are further compared, so that the effect of each method is judged. In a case where the voltage of a system border node 15 is increased by 2.3%, the data of absolute errors and relative errors of the active power, the reactive power and the voltage at a node 5 in columns M0-M3 are compared to judge the effect of each method.

The values of the active distribution network, the absolute error and the relative error are obtained by various methods, referring to Table 2, where M0 represents the active distribution network without using equivalence, M1 represents the PQ equivalence, M2 represents the conventional ZIP equivalence, and M3 represents the method for determining static equivalences of distribution networks according to the present disclosure. It can be obviously seen from the experimental results that the absolute error and relative error in M3 of the method for determining static equivalences of distribution networks according to the present disclosure are far less than that of other methods.

TABLE 2

Comparison of the calculated active power, reactive power and voltage at node 5 in each method

| | Parameters of node 5 | | | | | | | | | |
|---|---|---|---|---|---|---|---|---|---|---|
| | M0 | M1 | | | M2 | | | M3 | | |
| | Calculated value | Calculated value | $e_1$ | $e_2$ (%) | Calculated value | $e_1$ | $e_2$ (%) | Calculated value | $e_1$ | $e_2$ (%) |
| P(MW) | 23.8607 | 23.1913 | 0.6695 | 2.8058 | 31.6016 | 7.7408 | 32.4416 | 23.6975 | 0.1632 | 0.6841 |
| Q(Mvar) | 33.8702 | 2.9507 | 30.9195 | 91.2882 | 10.8248 | 23.0454 | 68.0403 | 33.9185 | 0.0483 | 0.1426 |
| V(p.u.) | 1.0012 | 1.0142 | 0.0130 | 1.2954 | 1.0096 | 0.0084 | 0.8365 | 1.0012 | 0.0000 | 0.0000 |

In the method for determining static equivalences of distribution networks of the present disclosure, the consistency of sensitivity and the consistency of power loss are considered comprehensively during static equivalence of the active distribution network, the generators' voltage and power support characteristics in the active distribution network are reserved, and the accuracy of equivalence of the active distribution network is thus ensured.

Figure 4:
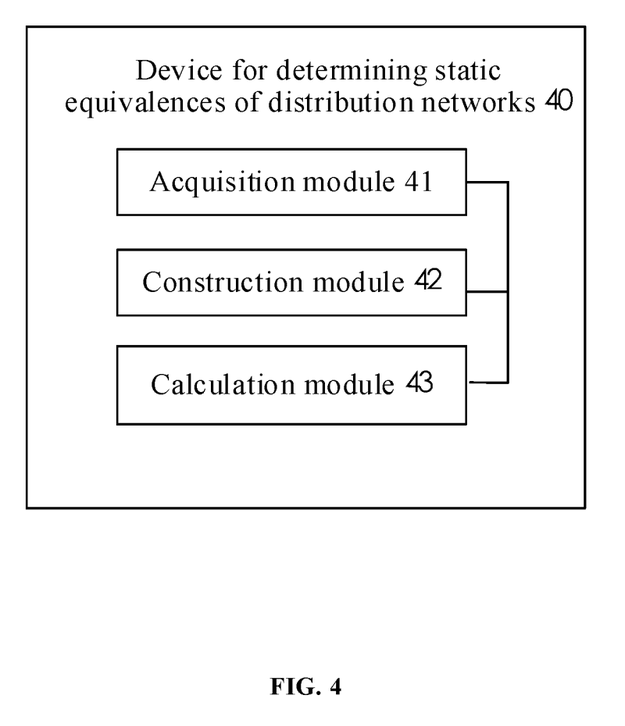
FIG. 4 is a schematic module diagram of an embodiment of a device for determining static equivalences of distribution networks according to the present disclosure.

In an embodiment, as shown in FIG. 4, the present disclosure provides a device 40 for determining static equivalences of distribution networks, including an acquisition module 41, a construction module 42 and a calculation module 43. The acquisition module 41 is configured to acquire node admittance matrices related to the border node and distribution network, power loss of the distribution network and a voltage value and a current value of the border node. The construction module 42 is configured to construct static equivalence determination conditions for determining static equivalences of distribution networks, wherein the static equivalence determination conditions includes: a consistency of sensitivity equation, a consistency of power loss equation, an equivalent network power balance equation and a Kirchhoff's current equation. The calculation module 43 is configured to calculate, based on the node admittance matrices, the power loss, and the voltage value and the current value and according to the static equivalence determination conditions, static equivalent parameters of the equivalent distribution network.

In an embodiment, the acquisition module 41 acquires node admittance matrices $Y_{LL(L\hat{B})(L\hat{B})}$, $Y_{LL(L\hat{E})(L\hat{E})}$, $Y_{LL(L\hat{E})(L\hat{B})}$ and $Y_{BI}$, and acquires power loss $S_{loss}$ of the distribution network, and a current value $I_B$ and a voltage value $V_B$ of the border node B, where the $Y_{LL(L\hat{B})(L\hat{B})}$ is a node admittance matrix between non-generator nodes at a border node B, the $Y_{LL(L\hat{E})(L\hat{E})}$ is a node admittance matrix between non-generator nodes at external nodes of the distribution network, the $Y_{LL(L\hat{E})(L\hat{B})}$ is a node admittance matrix between non-generator nodes at external nodes of the distribution network and a non-generator node at the border node B, and the $Y_{BI}$ is a matrix of the sum of admittances between the border node B and internal transmission network nodes. The construction module 42 constructs the consistency of sensitivity equation:

$$\frac{1}{Z_{eq1}} - \frac{Z_{eq2}}{Z_{eq1}^2 + Z_{eq1}Z_{eq2}} = Y_{LL(L\hat{B})(L\hat{B})} - Y_{LL(L\hat{B})(L\hat{E})}Y_{LL(L\hat{E})(L\hat{E})}^{-1}Y_{LL(L\hat{E})(L\hat{B})} - Y_{BI},$$

where $Z_{eq1}$ is the impedance between the border node B and an equivalent load node $L_{eq}$, and $Z_{eq2}$ is the impedance between the $L_{eq}$ and an equivalent generator node $G_{eq}$.

The construction module 42 constructs the consistency of power loss equation:

$$|I_B|^2 Z_{eq1} + |I_{Geq}|^2 Z_{eq2} = S_{loss},$$

where $|I_B|$ denotes the magnitude of the current value $I_B$, $|I_{Geq}|$ denotes the magnitude of the equivalent generator current at the $G_{eq}$, $Z_{eq1}$ is the impedance between the border node B and the $L_{eq}$, and $Z_{eq2}$ is the impedance between the $L_{eq}$ and the $G_{eq}$.

The construction module 42 constructs the equivalent network power balance equation:

$$I^*_B V_B - I^*_{Leq} V_B + I^*_{Leq} I_B Z_{eq1} + I^*_{Geq}(V_B - I_B Z_{eq1} + I_{Geq} Z_{eq2}) = S_{loss},$$

where $V_B$ is the voltage at the border node B, $I_{Leq}$ is the current at the $L_{eq}$, $I_{Geq}$ is the current at the $G_{eq}$, $V_{Leq}$ is the voltage at the $L_{eq}$, and $V_{Geq}$ is the voltage at the $G_{eq}$.

The construction module 42 constructs the Kirchhoff's current equation:

$$I_{Leq} + I_{Geq} I_B = 0.$$

Based on the node admittance matrices, the power loss, and the voltage value and the current value, the calculation module 43 solves the consistency of sensitivity equation, the consistency of power loss equation, the equivalent network power balance equation and the Kirchhoff's current equation to obtain $Z_{eq1}$, $Z_{eq2}$, $I_{Leq}$ and $I_{Geq}$.

The construction module 42 constructs a first formula: $S_B = I^*_B V_B$; constructs a second formula: $V_{Leq} = V_B - I_B Z_{eq1}$; constructs a third formula: $S_{Leq} = I^*_{Leq} V_{Leq}$; constructs a fourth formula: $V_{Geq} = V_{Leq} + I_{Geq} Z_{eq2}$; and, constructs a fifth formula: $S_{Geq} = I^*_{Geq} V_{Geq}$. Based on the node admittance matrices, the power loss, and the voltage value and the current value, the calculation module 43 solves the second formula, the third formula, the fourth formula and the fifth formula to obtain $V_{Leq}$, $S_{Leq}$, $V_{Geq}$, and $S_{Geq}$, where $S_B$ is the power at the border node B, $S_{Leq}$ is the power at the $L_{eq}$, and $S_{Geq}$ is the power at the $G_{eq}$.

In the method and device for determining static equivalences of distribution networks provided in the embodiment, in view of the shortcomings of the existing static equivalent methods of an active distribution network, a static equivalent method of an active distribution network by comprehensively considering the consistency of sensitivity and the consistency of power loss is provided. Thus, the inventive method and device are simple and effective, the consistency of sensitivity and the consistency of power loss before and after equivalence are considered comprehensively. Moreover, by constructing physical equivalent networks including equivalence generators, branches and loads by using the power flow state information of the current power transmission network and distribution network and then obtaining equivalent parameters, the accuracy of equivalence of the active distribution network is improved.

The method and system of the present disclosure may be implemented in various ways. For example, the method and system of the present disclosure may be implemented by software, hardware, firmware or any combination thereof The order of the steps of the method is merely for description, and the steps of the method of the present disclosure are not limited to the specific order described above, unless otherwise specified in other ways. In addition, in some embodiments, the present disclosure may also be implemented as programs recoded on a recording medium. These programs include machine-readable instructions for implementing the method of the present disclosure. Therefore, the present disclosure further encompasses the recording medium for storing the programs for implementing the method of the present disclosure.

The descriptions of the present disclosure are merely exemplary and illustrative, but not exhaustive or not intended to limit the present disclosure to the forms disclosed herein. It is apparent for a person of ordinary skill in the art to make various modifications and alterations. The embodiments selected and described herein are merely for better describing the principle and practical applications of the present disclosure, and enable a person of ordinary skilled in the art to understand the present disclosure and design various embodiments with various modifications for a particular purpose.

What is claimed is:

1. A method for determining static equivalences of a plurality of physical electrical distribution networks for distributing electric power in power systems, comprising the steps of:

acquiring, executed by a processor, node admittance matrices of a physical electrical border node and each of the physical electrical distribution networks of the power systems to distribute the electric power, a first power loss of the each of the physical electrical distribution networks, and a first voltage value and a first current value of the physical electrical border node before a static equivalence state;

constructing, by the processor, static equivalence determination conditions for determining static equivalences of the each of the physical electrical distribution networks, wherein the static equivalence determination conditions comprise a consistency of sensitivity equation, a consistency of power loss equation, an equivalent network power balance equation and a Kirchhoff's current equation;

calculating, by the processor, based on the node admittance matrices, a second power loss, and a second voltage value and a second current value and according to the static equivalence determination conditions, static equivalent parameters of the each of the physical electrical distribution networks after the static equivalence state;

performing, by the processor, equalization on the physical electrical distribution networks; and applying, by the processor, the second power loss, the second voltage value and the second current value to a transmission network connected to the physical electrical distribution networks with consistency of sensitivity and power loss considered for distributing the electric power in the power systems, thus changing in power injection direction from the transmission network to the physical electrical distribution networks being reflected and improving an accuracy of steady-state analysis of the power systems, wherein the transmission network comprises a plurality of components including electrical loads, electrical branches and distribution generators.

2. The method according to claim 1, wherein the step of acquiring node admittance matrices related to a physical electrical border node and each of the physical electrical distribution networks, power loss of the each of the physical electrical distribution networks, and a first voltage value and a first current value of the physical electrical border node comprises:

acquiring node admittance matrices and $Y_{LL(L\hat{B})(L\hat{B})}$, $Y_{LL(L\hat{E})(L\hat{E})}$, $Y_{LL(L\hat{E})(L\hat{B})}$ and $Y_{BI}$, where the $Y_{LL(L\hat{B})(L\hat{B})}$ is a node admittance matrix between non-generator nodes at the physical electrical border node B, the $Y_{LL(L\hat{E})(L\hat{E})}$ is a node admittance matrix between non-generator nodes at external nodes of the each of the physical electrical distribution networks, the $Y_{LL(L\hat{E})(L\hat{B})}$ is a node admittance matrix between non-generator nodes at external nodes of the each of the distribution networks and a non-generator node at the physical electrical border node B, and the $Y_{BI}$ is a matrix of the sum of admittances between the physical electrical border node B and internal transmission network nodes; and acquiring power loss $S_{loss}$ of the electrical physical distribution networks, and a current value $I_B$ and a voltage value $V_B$ at the physical electrical border node B.

3. The method according to claim 2, wherein the step of constructing static equivalence determination conditions for determining static equivalences of the physical electrical distribution networks comprises:

constructing the consistency of sensitivity equation:

$$\frac{1}{Z_{eq1}} - \frac{Z_{eq2}}{Z_{eq1}^2 + Z_{eq1}Z_{eq2}} = Y_{LL(L\hat{B})(L\hat{B})} - Y_{LL(L\hat{B})(L\hat{E})} Y_{LL(L\hat{E})(L\hat{E})}^{-1} Y_{LL(L\hat{E})(L\hat{B})} - Y_{BI},$$

where $Z_{eq1}$ is the impedance between the physical electrical border node B and an equivalent load node $L_{eq}$, and $Z_{eq2}$ is the impedance between the $L_{eq}$ and an equivalent generator node $G_{eq}$;

constructing the consistency of power loss equation:

$$|I_B|^2 Z_{eq1} + |I_{Geq}|^2 Z_{eq2} = S_{loss},$$

where $|I_B|$ denotes the magnitude of the current value $I_B$, $|I_{Geq}|$ denotes the magnitude of the equivalent generator current at the $G_{eq}$, $Z_{eq1}$ is the impedance between the physical electrical border node B and the $L_{eq}$, and $Z_{eq2}$ is the impedance between the $L_{eq}$ and the $G_{eq}$;

constructing the equivalent network power balance equation:

$$I^*_B V_B - I^*_{Leq} V_B + I^*_{Leq} I_B Z_{eq1} + I^*_{Geq}(V_B - I_B Z_{eq1} + I_{Geq} Z_{eq2}) = S_{loss},$$

where $V_B$ is the voltage at the physical electrical border node B, $I_{Geq}$, is the current at the $L_{eq}$, $I_{eq}$ is the current at the $G_{eq}$, $V_{Leq}$ is the voltage at the $L_{eq}$, and $V_{Geq}$ is the voltage at the $G_{eq}$; and constructing the Kirchhoff's current equation:

$$-I_{Leq} + I_{Geq} + I_B = 0.$$

4. The method according to claim 3, wherein the step of calculating, based on the node admittance matrices, a second power loss, and a second voltage value and a second current value and according to the static equivalence determination conditions, static equivalent parameters of the each of the equivalent distribution networks comprises:

based on the node admit matrices, the second power loss, and the second voltage value and the second current value, solving the consistency of sensitivity equation, the consistency of power loss equation, the equivalent network power balance equation and the Kirchhoff's current equation to obtain $Z_{eq1}$, $Z_{eq2}$, $I_{Leq}$ and $I_{Geq}$, wherein $L_{eq}$ is the current at the $L_{eq}$, $I_{Geq}$ is the current at the $G_{eq}$, $Z_{eq1}$ is the impedance between the physical electrical border node B and the $L_{eq}$, and $Z_{eq2}$ is the impedance between the $L_{eq}$ and the $G_{eq}$.

5. The method according to claim 4, wherein the step of constructing the equivalent network power balance equation further comprises:

constructing a first formula: $S_B = I^*_B V_B$;
constructing a second formula: $V_{Leq} = V_B - I_B Z_{eq1}$;
constructing a third formula: $S_{Leq} = I^*_{Leq} V_{Leq}$;
constructing a fourth formula: $V_{Geq} = V_{Leq} + I_{Geq} Z_{eq2}$; and
constructing a fifth formula: $S_{Geq} = I^*_{Geq} V_{Geq}$;

wherein the step of calculating, based on the node admittance matrices, a second power loss, and a second voltage value and a second current value and according to the static equivalence determination conditions, the static equivalent parameters further comprises:

based on the node admittance matrices, the second power loss, and the second voltage value and the second current value, solving the second formula, the third formula, the fourth formula and the fifth formula to obtain $V_{Leq}$, $S_{Leq}$, $V_{Geq}$, and $V_{Geq}$, where $S_B$ is the power at the physical electrical border node B, $S_{Leq}$ is the power at the $L_{eq}$, and $S_{Geq}$ is the power at the $G_{eq}$.

6. A non-transitory computer-readable medium storing instructions which, when executed by a processor, cause a device to determining static equivalences of a plurality of physical electrical distribution networks for distributing electric power in power systems, comprising the steps of:

acquiring, executed by the processor, node admittance matrices of an physical electrical border node and each of the physical electrical distribution networks of the power systems to distribute the electric power, a first power loss of the each of the physical electrical distribution networks, and a first voltage value and a first current value of the physical electrical border node before a static equivalence state;

constructing, by the processor, static equivalence determination conditions for determining static equivalences of the each of the physical electrical distribution networks, wherein the static equivalence determination conditions comprise a consistency of sensitivity equation, a consistency of power loss equation, an equivalent network power balance equation and a Kirchhoff's current equation;

calculating, by the processor, based on the node admittance matrices, a second power loss, and a second voltage value and a second current value and according to the static equivalence determination conditions, static equivalent parameters of the each of the physical electrical distribution networks after the static equivalence state;

performing, by the processor, equalization on the physical electrical distribution networks; and applying, by the processor, the second power loss, the second voltage value and the second current value to a transmission network connected to the distribution networks with consistency of sensitivity and power loss considered for distributing the electric power in the power systems, thus changing in power injection direction from the transmission network to the physical electrical distribution networks being reflected and improving an accuracy of steady-state analysis of the power systems, wherein the transmission network comprises a plurality of components including electrical loads, electrical branches and distribution generators.

* * * * *